United States Patent
Yudkin et al.

(10) Patent No.: US 9,189,603 B2
(45) Date of Patent: Nov. 17, 2015

(54) KILL SWITCH SECURITY METHOD AND SYSTEM

(75) Inventors: Roman O. Yudkin, Carlsbad, CA (US); Joshua T. Staker, San Diego, CA (US); William M. Goldbach, Encinitas, CA (US); Curtis H. Staker, Encinitas, CA (US)

(73) Assignee: Confident Technologies, Inc., Solana Beach, CA (US)

( * ) Notice: Subject to any disclaimer, the term of this patent is extended or adjusted under 35 U.S.C. 154(b) by 52 days.

(21) Appl. No.: 13/464,734

(22) Filed: May 4, 2012

(65) Prior Publication Data
US 2013/0117813 A1    May 9, 2013

Related U.S. Application Data

(63) Continuation-in-part of application No. 12/977,559, filed on Dec. 23, 2010, now Pat. No. 8,850,519, which is a continuation of application No. 11/677,562, filed on Feb. 21, 2007, now abandoned, which is a
(Continued)

(51) Int. Cl.
*G06F 21/36* (2013.01)
*G06F 21/00* (2013.01)
(Continued)

(52) U.S. Cl.
CPC ................ *G06F 21/00* (2013.01); *G06F 21/30* (2013.01); *G06F 21/31* (2013.01); *G06F 21/36* (2013.01); *H04L 9/32* (2013.01); *H04L 9/3226* (2013.01); *H04L 63/083* (2013.01); *H04L 9/3271* (2013.01)

(58) Field of Classification Search
CPC ......... G06F 21/00; G06F 21/12; G06F 12/03; G06F 21/04; G06F 2211/003; H04L 9/08; H04L 9/32; H04L 29/067; H04L 63/083; H04L 63/0846; H04L 2463/081
USPC .................... 726/1–21, 26–30; 713/168–175, 713/182–186; 3/1–21, 26–30
See application file for complete search history.

(56) References Cited

U.S. PATENT DOCUMENTS

| 5,276,314 A | 1/1994 | Martino et al. |
| 5,428,349 A | 6/1995 | Baker |

(Continued)

FOREIGN PATENT DOCUMENTS

| JP | 11345026 A | 12/1999 |
| JP | 2001092785 A | 4/2001 |

(Continued)

OTHER PUBLICATIONS

Clark, Jeremy, and Urs Hengartner. "Panic Passwords: Authenticating under Duress." HotSec 8 (2008): 8.*
(Continued)

*Primary Examiner* — Madhuri Herzog
(74) *Attorney, Agent, or Firm* — San Diego IP Law Group LLP

(57) ABSTRACT

The present invention provides, in at least one embodiment, a system and method to bolster website and mobile authentication providing an additional security layer for access to password protected information. An authorized user is asked to select a kill switch, including one or more image categories or alphanumeric characters that the authorized user would never select while inputting their password. If the kill switch is entered once or too many times, as defined and specified ahead of time by a set of rules and conditions, during password entry, the kill switch kills the password entry operation. User input can be evaluated at the time of entry according to these rules by a rule processing decision engine. Killing the operation can include taking one or more actions, such as locking out the user, sending a notification of breach, and cataloging information about the source of the breach.

9 Claims, 5 Drawing Sheets

Related U.S. Application Data continuation-in-part of application No. 11/420,061, filed on May 24, 2006, now abandoned.

(60) Provisional application No. 61/483,388, filed on May 6, 2011.

(51) Int. Cl.
 *G06F 21/30* (2013.01)
 *H04L 29/06* (2006.01)
 *G06F 21/31* (2013.01)
 *H04L 9/32* (2006.01)

(56) References Cited

U.S. PATENT DOCUMENTS

| | | | |
|---|---|---|---|
| 5,465,084 A | 11/1995 | Cottrell | |
| 5,559,961 A | 9/1996 | Blonder | |
| 5,608,387 A | 3/1997 | Davies | |
| 5,664,099 A | 9/1997 | Ozzie et al. | |
| 5,821,933 A | 10/1998 | Keller et al. | |
| 5,928,364 A | 7/1999 | Yamamoto | |
| 5,948,061 A | 9/1999 | Merriman et al. | |
| 6,102,406 A | 8/2000 | Miles et al. | |
| 6,209,104 B1 | 3/2001 | Jalili | |
| 6,351,634 B1 | 2/2002 | Shin | |
| 6,686,931 B1 | 2/2004 | Bodnar | |
| 6,718,471 B1 | 4/2004 | Kashima | |
| 6,720,860 B1 | 4/2004 | Narayanaswami | |
| 6,792,466 B1 | 9/2004 | Saulpaugh et al. | |
| 6,823,075 B2 | 11/2004 | Perry | |
| 6,862,594 B1 | 3/2005 | Saulpaugh et al. | |
| 6,871,288 B2 * | 3/2005 | Russikoff | 726/19 |
| 6,895,387 B1 | 5/2005 | Roberts et al. | |
| 6,950,949 B1 | 9/2005 | Gilchrist | |
| 6,980,081 B2 | 12/2005 | Anderson | |
| 6,981,016 B1 | 12/2005 | Ryan | |
| 7,021,534 B1 | 4/2006 | Kiliccote | |
| 7,028,192 B2 | 4/2006 | Butler | |
| 7,093,282 B2 | 8/2006 | Hillhouse | |
| 7,130,831 B2 | 10/2006 | Howard et al. | |
| 7,219,368 B2 | 5/2007 | Jules et al. | |
| 7,225,157 B2 | 5/2007 | Howard et al. | |
| 7,240,367 B2 | 7/2007 | Park | |
| 7,451,323 B2 | 11/2008 | Abe et al. | |
| 7,536,556 B2 | 5/2009 | Federova et al. | |
| 7,549,170 B2 | 6/2009 | Stubblefield et al. | |
| 7,552,330 B2 | 6/2009 | Kokumai | |
| 7,562,222 B2 | 7/2009 | Gasparini et al. | |
| 7,574,739 B2 | 8/2009 | Shirakawa | |
| 7,577,994 B1 | 8/2009 | Sobel et al. | |
| 7,603,565 B2 * | 10/2009 | Baird et al. | 713/184 |
| 7,665,146 B2 * | 2/2010 | Munje et al. | 726/28 |
| 7,680,815 B2 | 3/2010 | Komine et al. | |
| 7,884,825 B2 | 2/2011 | Nakahashi et al. | |
| 7,980,464 B1 * | 7/2011 | Sarris et al. | 235/379 |
| 2001/0007097 A1 | 7/2001 | Kim | |
| 2001/0013039 A1 | 8/2001 | Choi | |
| 2001/0037314 A1 | 11/2001 | Ishikawa | |
| 2001/0037468 A1 | 11/2001 | Gaddis | |
| 2002/0019768 A1 | 2/2002 | Fredrickson et al. | |
| 2002/0083347 A1 | 6/2002 | Taguchi | |
| 2002/0094868 A1 | 7/2002 | Tuck et al. | |
| 2002/0188872 A1 | 12/2002 | Willeby | |
| 2003/0046551 A1 | 3/2003 | Brennan | |
| 2003/0084275 A1 | 5/2003 | David et al. | |
| 2003/0093699 A1 | 5/2003 | Banning et al. | |
| 2003/0177248 A1 | 9/2003 | Brown et al. | |
| 2003/0177366 A1 | 9/2003 | de Jong | |
| 2003/0191947 A1 | 10/2003 | Stubblefield et al. | |
| 2003/0210127 A1 | 11/2003 | Anderson | |
| 2003/0215110 A1 | 11/2003 | Rhoads et al. | |
| 2004/0010721 A1 | 1/2004 | Kirovski et al. | |
| 2004/0030934 A1 | 2/2004 | Mizoguchi et al. | |
| 2004/0111648 A1 | 6/2004 | Fujisawa | |
| 2004/0172564 A1 | 9/2004 | Federova et al. | |
| 2004/0230843 A1 | 11/2004 | Jansen | |
| 2004/0250138 A1 | 12/2004 | Schneider | |
| 2004/0260955 A1 | 12/2004 | Mantyla | |
| 2005/0010758 A1 | 1/2005 | Landrock et al. | |
| 2005/0010768 A1 | 1/2005 | Light et al. | |
| 2005/0071637 A1 | 3/2005 | Shirakawa | |
| 2005/0071686 A1 | 3/2005 | Bagga et al. | |
| 2005/0076357 A1 | 4/2005 | Fenne | |
| 2005/0169496 A1 | 8/2005 | Perry | |
| 2005/0245229 A1 * | 11/2005 | Brown et al. | 455/404.1 |
| 2005/0268100 A1 | 12/2005 | Gasparini et al. | |
| 2005/0268101 A1 | 12/2005 | Gasparini et al. | |
| 2005/0268107 A1 | 12/2005 | Harris et al. | |
| 2005/0276442 A1 | 12/2005 | Alasia et al. | |
| 2005/0283443 A1 | 12/2005 | Hardt | |
| 2005/0283614 A1 | 12/2005 | Hardt | |
| 2006/0020812 A1 | 1/2006 | Steinberg et al. | |
| 2006/0020815 A1 | 1/2006 | Varghese et al. | |
| 2006/0053293 A1 | 3/2006 | Zagar et al. | |
| 2006/0059539 A1 * | 3/2006 | Shashikumar et al. | 726/1 |
| 2006/0075027 A1 | 4/2006 | Zager et al. | |
| 2006/0075028 A1 | 4/2006 | Zager et al. | |
| 2006/0085360 A1 | 4/2006 | Grim, III et al. | |
| 2006/0105739 A1 | 5/2006 | Frank et al. | |
| 2006/0174339 A1 | 8/2006 | Tao | |
| 2006/0183551 A1 | 8/2006 | Prudent | |
| 2006/0206717 A1 | 9/2006 | Holt et al. | |
| 2006/0206918 A1 | 9/2006 | McLean | |
| 2006/0206919 A1 | 9/2006 | Montgomery et al. | |
| 2006/0230435 A1 | 10/2006 | Kokumai | |
| 2006/0248344 A1 | 11/2006 | Yang | |
| 2007/0023506 A1 | 2/2007 | Lagadec et al. | |
| 2007/0033102 A1 | 2/2007 | Frank et al. | |
| 2007/0041621 A1 | 2/2007 | Lin et al. | |
| 2007/0074119 A1 | 3/2007 | Komine et al. | |
| 2007/0130618 A1 * | 6/2007 | Chen | 726/8 |
| 2007/0180493 A1 | 8/2007 | Croft et al. | |
| 2007/0198846 A1 | 8/2007 | Watari | |
| 2007/0250920 A1 | 10/2007 | Lindsay | |
| 2007/0277224 A1 | 11/2007 | Osborn et al. | |
| 2008/0052245 A1 | 2/2008 | Love | |
| 2008/0141351 A1 | 6/2008 | Park | |
| 2008/0222710 A1 | 9/2008 | Blagsvedt et al. | |
| 2008/0235788 A1 | 9/2008 | El Saddik et al. | |
| 2008/0307310 A1 | 12/2008 | Segal et al. | |
| 2008/0320310 A1 | 12/2008 | Florencio et al. | |
| 2009/0037339 A1 | 2/2009 | Ancell et al. | |
| 2009/0038006 A1 | 2/2009 | Traenkenschuh et al. | |

FOREIGN PATENT DOCUMENTS

| | | |
|---|---|---|
| KR | 20020026636 A | 4/2002 |
| KR | 20040032869 A | 4/2002 |
| KR | 20040047155 A | 6/2004 |
| KR | 20040067123 A | 1/2006 |
| KR | 20060127850 A | 12/2006 |
| NZ | 541711 A | 7/2005 |
| WO | 02054199 A1 | 7/2002 |
| WO | 2006064241 A2 | 6/2006 |

OTHER PUBLICATIONS

Dhamija et al., Deja Vu: A User Study Using Images for Authentication, Proceedings of the 9th USENIX Security Symposium, Denver, Colorado, Aug. 14-17, 2000, 15 pages.

* cited by examiner

KILL SWITCH SECURITY METHOD AND SYSTEM

CROSS-REFERENCE TO RELATED APPLICATIONS

The present invention claims priority to and is a continuation-in-part of U.S. patent application Ser. No. 12/977,559, entitled "Methods and Systems for Graphical Image Authentication," and filed Dec. 23, 2010, now U.S. Pat. No. 8,850,519 which is a continuation of U.S. patent application Ser. No. 11/677,562, entitled "Methods and Systems for Graphical Image Authentication," and filed Feb. 21, 2007, now abandoned which is a continuation-in-part of U.S. patent application Ser. No. 11/420,061, entitled "Graphical Image Authentication and Security System," and filed May 24, 2006, now abandoned the disclosures of all of which are herein incorporated by reference in their entireties. The present invention also claims priority to U.S. Provisional Patent Application No. 61/483,388, entitled "Kill Switch Security Method and System," and filed May 6, 2011, the disclosure of which is herein incorporated by reference in its entirety.

BACKGROUND OF THE INVENTION

1. Field of Invention

The invention relates generally to a method and system of authenticating a user of a computer system and more particularly, to a password operation kill switch on an identity authentication and security system.

2. Description of Related Art

Computer networks, particularly those with global reach such as the Internet, have greatly influenced the way that individuals, companies and institutions conduct transactions, and store and retrieve documents, images, music, and video. Convenience, ease of use, speed, and low overhead costs are contributing factors to the widespread use of the Internet for purchasing goods as well as conducting confidential transactions. Entire industries have emerged as a result of the evolution of the Internet.

Secure access to computer systems and computer networks has been traditionally guarded with a username and password pair. This requires the user to protect the username and password from disclosure and unauthorized use by interlopers. If the username and password are not protected, accounts and files can be compromised—often leading to, among other things, financial fraud. Unfortunately, a number of rogue individuals and organizations have emerged that are dedicated to fraudulently obtaining confidential information for unauthorized or criminal activities.

A pervasive tool used in obtaining confidential information is keystroke-logging software, which employs a program that monitors and records what users type on their respective computers. Such software often comprises the payload of viruses, worms, Trojan horses, and other forms of malware that can compromise confidentiality and negatively affect computer performance. Keystroke-logging software can reveal what a user is typing on a computer, e.g., logins and passwords, without the user's knowledge of this event occurring. Companies and institutions routinely use keystroke-logging software to monitor employee activity. Also, families may use these types of programs to monitor children's online activities. The widespread availability of this type of software, however, has led to unauthorized or criminal use, resulting in the alarming rate of identity theft seen throughout the world.

Prime targets for these attacks are financial institutions and their respective customers, as more and more consumers and businesses use electronic methods for purchasing and making payments. The future trend is in favor of electronic transactions over cash, providing a wider field for identity theft.

Login information may also be heard by sophisticated analysis of the distinct sounds made by different keys. An inexpensive microphone near a keyboard can reveal most of what is being typed with a surprising degree of accuracy. Login information is also vulnerable to simple spying or shoulder-surfing, as a person with malicious intent watches an unsuspecting user sign into his or her account. The rise in popularity of portable hand-held Internet devices creates a need for these security issues to be directly addressed by a security system tailored for the limitations and security challenges associated therewith. As these devices are often used in places that are more public and less secure, shoulder-surfing is more likely.

Portable hand-held Internet devices also can be difficult to use to enter passwords, as keyboards or touch-screens are often very small on such devices and use of such to enter passwords may cause error. Therefore, simplification of authentication input is desired while maintaining or increasing user security.

Additional security mechanisms are necessary in addition to the username/password paradigm to provide stronger identity authentication. There have been various other attempts do so.

Enterprises and institutions are using costly physical devices to identify legitimate customers and users. The existing devices (often referred to as tokens) generate a unique and random pass code for each user every 30 to 60 seconds. If an attacker manages to intercept a user ID and password, the information cannot be used to access the site without an additional authentication identifier. The devices significantly reduce instances of identity or information theft, but present implementation challenges for both the institutions and individual users. For example, physical tokens may be misplaced and/or lost.

The enterprise may be met with consumer resistance in implementing the use of the physical device. If the user does not have the device, he or she cannot gain access to the site. Besides the tremendous initial cost of purchasing the physical devices and implementing the new system, if the device is lost, stolen, or damaged, the enterprise will incur even more significant costs. In the context of business use of the device, the company incurs the cost of lost productivity from a worker who cannot access company information, as well as the cost of replacing the actual device. In the context of consumer use, if the consumer cannot access his or her accounts because of a lost device, the direct costs, and more significantly, the indirect costs incurred by the enterprise to assist the consumer in gaining access far outweighs the advantages of using the device system.

In U.S. Pat. No. 5,559,961, Blonder provides a solution for utilizing graphical passwords. The framework described displays a static image in which the user touches predetermined areas of the screen, called tap regions, in a particular sequence. As the user taps various areas on the display, the regions tapped are successively removed from the screen. These regions of the screen, and the order of the sequence they are tapped, are chosen by the user during an initial enrollment phase. The sequence and regions of taps is stored in the system as the user's password. One shortcoming of this solution is the likelihood of a shoulder-surfing attack: once an attacker views a user entering the sequence by touching areas of the screen, he or she is then easily able to replicate the sequence to successfully gain access to the user's account.

U.S. Pat. No. 7,549,170 to Stubblefield uses inkblots as images for authentication of a user's identity when logging into computer systems. The authentication method described in Stubblefield provides for a display of a random sequence of inkblots that the user has identified when he or she enrolled his or her login information. One drawback to this process stems from the identification of the inkblot. Although the user is required to identify and verify the alphanumeric text associated with the inkblots in the enrollment process, the unspeakable nature of inkblots will cause consumers problems in remembering the code for their inkblot selections. A frustrated user will simply save their password information on their computer, write the information down, or enter incorrect password information, which defeats the security offered by this system. Also, this process is very intimidating for users, especially those who are new users, because the inkblot is easily misconstrued as a countless number of different objects. The inkblot is just that: a blot on a screen the user will associate with a real world object. If that user misinterprets or forgets the association they have made with the inkblot, then they are denied access to their system. More importantly, the sequence process significantly increases login time for users. Currently, users are demanding more secure login techniques, but they desire to maintain the same level of convenience that they currently enjoy with the username/password login process. This authentication technique does not provide the ease of use that consumers desire.

U.S. Patent Application Publication No. 2004/0230843 to Jansen, which is a login authentication process using a sequence of images selected by the user, illustrates the potential of image-based authentication in protecting users from identity theft. The authentication method described in Jansen begins with the user selecting an image theme, such as animals, and then selecting a sequence of images within the image theme that becomes the password (e.g., if the category chosen is animals, one possible sequence is horse, cat, dog, cat, cat, horse). The success of the login process is predicated on the user's ability to replicate the sequence of images he or she has chosen within the image theme. In other words, the user must memorize the proper sequence. One drawback appears to be the complex nature of the sequence process. As defined in Jansen, if a user feels that he or she will be unable to remember the password, the user will simply write down the password so that recall becomes unnecessary. Also, because the images are typically static (the user can elect to shuffle images between login attempts, but most will likely stay with the simple default configuration), software can be created to automate the process. In this scenario, the authentication requires no human interaction to complete the login, which tremendously decreases the level of security provided. Although the positions of the images can be shuffled within the grid, the fact that they are static means that shuffling only prevents attackers from guessing the likely placement of the sequence, not the images themselves. Moreover, the traditional text password is completely removed from the login process, meaning that the security offered in this solution is only single layer, whereas authentication processes that complement the existing login process provide multiple levels of security.

U.S. Pat. No. 7,562,222 and U.S. Patent Publication No. 2005/0268101 to Gasparini et al. discloses two way authentication including images which serve as customization information so that an entity can authenticate itself to a user, but is otherwise dissimilar.

U.S. Patent Application Publication No. 2003/0210127 to Anderson discloses an authentication key formed from a number of selected icons, e.g., a heart, a spade, and a diamond. During an authentication session, the user is presented with a matrix of icons including the pre-selected icons and other non-authenticating icons. The user selects a number of the presented icons and if the user selects the pre-selected icons (rather than any non-authenticating icons), the user is authenticated. One drawback of Anderson's authentication technique is that it suffers from many of the drawbacks associated with static passwords. For example, if the password is comprised (e.g., an interloper knows of the selected icons for that user), a positive authentication may be recognized for someone other than the actual authenticated user associated with the password.

Since many users share their passwords between multiple accounts, a user may use the same password on sensitive accounts (e.g., online banking, PayPal, email, etc.) as with accounts whose system and infrastructure may not be so secure. If the password is compromised from a less secure account, the password can be used on the more secure accounts. As such, additional levels of security are needed to prevent that password from being used on the user's other accounts, to prevent fraudulent online activity, mobile device abuse and misuse, unwanted personal information disclosure, and defamation via unauthorized social network postings.

A brute force password attack is an exhaustive alphanumeric search that systematically checks all possible letters, numbers, and characters until the correct password is found. In the worst case scenario, this attack would involve traversing the entire search space. A dictionary password attack, on the other hand, is a technique for defeating a password authentication mechanism by searching likely possibilities. A dictionary attack uses a targeted technique of successively trying all the words in a prearranged list of values (e.g., from a dictionary). In contrast with the brute force attack, where a large proportion key space is searched systematically, a dictionary attack tries only those possibilities which are most likely to succeed. Generally, dictionary attacks succeed because many people have a tendency to choose passwords which are short (e.g., 7 characters or fewer), single words found in dictionaries, or simple, easily-predicted variations on words, such as appending a digit.

Countermeasures against dictionary and brute force password attacks include limiting the number of attempts that a password can be tried unsuccessfully, introducing a time delay between successive attempts, and locking accounts out after unsuccessful logon attempts. Website administrators may also prevent a particular IP address from trying more than a predetermined number of password attempts against any account on the site.

However, these countermeasures fall short, since they do not distinguish between an authorized user who barely mistypes their password (or types another one of their passwords) and an unauthorized user whose attempts are nowhere even close, such as in a brute force or dictionary attack. As such, the countermeasures are not able to use this chance to catalog this relevant information about the unauthorized user's suspected breach, and as such, unauthorized users are less likely to be investigated and caught.

Because of these noted shortcomings, an improved system and method is needed to create a security system that is exceedingly difficult for an interloper to compromise, while simultaneously easy for a user to apply and maintain.

SUMMARY OF THE INVENTION

The present invention overcomes these and other deficiencies of the prior art by providing a security technique to prevent interlopers from comprising an authentication system implemented in, for example, website and mobile authentication applications.

In an embodiment of the invention, a user is required to select a number of image categories at the time of registration that the user can remember. For example, a user may select three image categories: dogs, cars, and clocks, from a greater number of available image categories. During a subsequent authentication session, the user is presented with a random grid (e.g., 3×3 matrix) of images, each of which is associated with a different alphanumeric character, and the user need only identify the images of dogs, cars, and clocks and then enter the corresponding alphanumeric characters. Other non-selected image categories such as fish, flowers, and people, are included in the grid. If the alphanumeric characters entered by the user match those expected by the system (e.g., those displayed and associated with dogs, cars, and clocks), the user is authenticated. If the user enters an unexpected alphanumeric character (e.g., those displayed and associated with fish, flowers, or people), authentication will fail. Such an image-based authentication technique may be used as a second layer of security on top of a conventional login and password technique.

Furthermore, an authorized user is asked to select a "kill switch," including one or more image categories and/or alphanumeric characters that the authorized user would never select while inputting their password. If the kill switch is entered once or too many times, as defined and specified ahead of time by a predetermined set of rules and conditions, during password entry, the kill switch kills the authentication operation. User input can be evaluated at the time of entry according to these rules by a rule processing decision engine. Killing the operation can include taking one or more actions, such as locking out the user, sending a notification of breach, and cataloging information about the source of the breach.

In one embodiment of the invention, a method comprises the steps of: selecting a kill switch comprising a keyboard character and/or an image category which should never be inputted during password entry; receiving a password entry from a user; and taking one or more actions when the password entry includes the kill switch. The kill switch may comprise one or more of any of the characters on a keyboard or one or more categories of images. The actions may include not providing an authentication of identity to a computer system, automatically locking out an authorized user, sending a discrete notification of breach to the authorized user or a security professional, or cataloging information about the user. The password entry may be received from a computer or smartphone. The user may comprise an authorized user or a non-authorized user.

An advantage of the present invention is that it provides an offensive technique to combat brute force attempts at guessing a password and dictionary attacks by computers. Further, the kill switch improves a system's security in website and mobile authentication by strengthening the password protection and capturing information regarding the source of the unauthorized attempts. This increases the security of transactions thus decreasing the probability of unauthorized access. The kill switch may also catalog information about the source of the breach, such that investigation and capture of unauthorized users is more likely.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows.

DETAILED DESCRIPTION OF EMBODIMENTS

Figure 1:
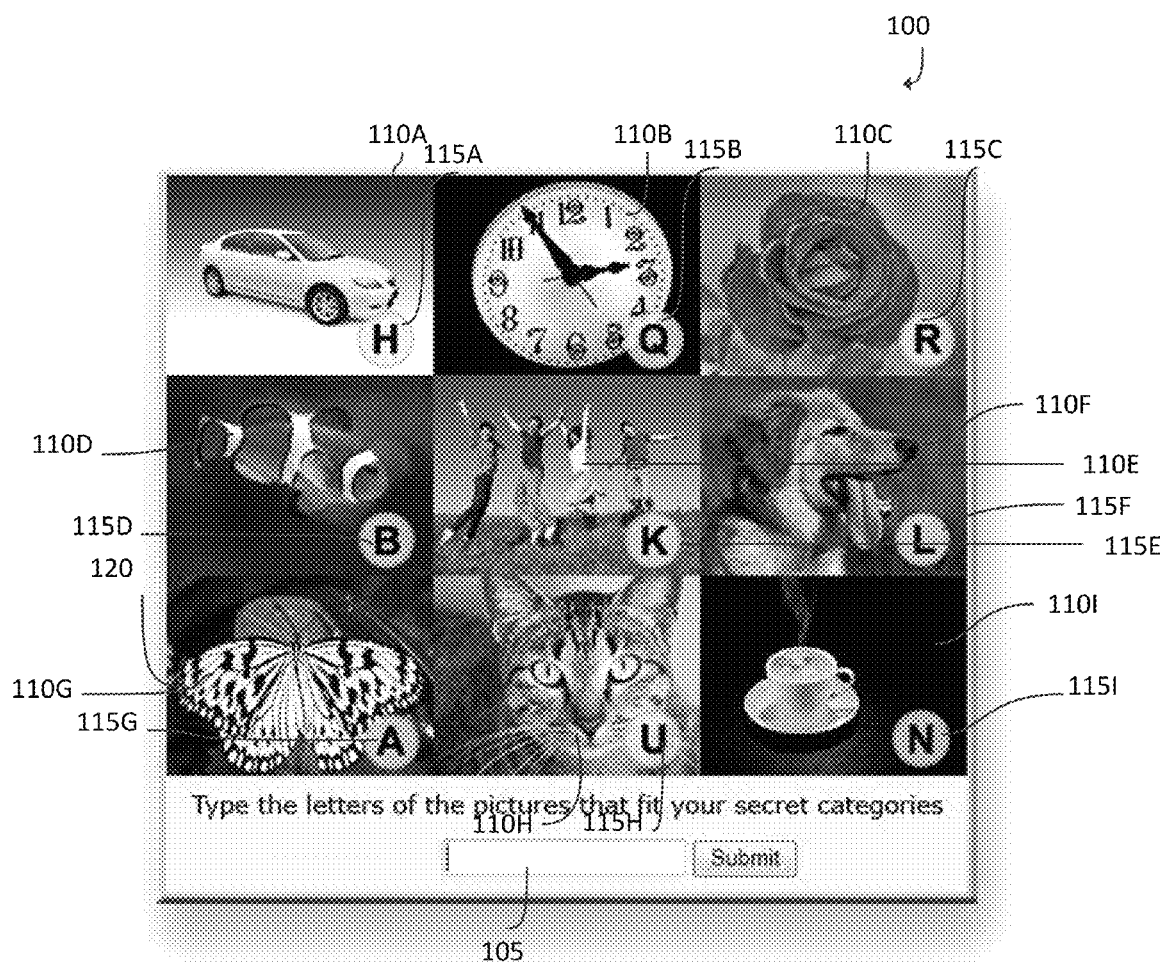
FIG. 1 illustrates a 3×3 image grid identity authentication and security system according to an embodiment of the invention.

Further features and advantages of the invention, as well as the structure and operation of various embodiments of the invention, are described in detail below with reference to the accompanying FIGS. 1-5, wherein like reference numerals refer to like elements. Although the invention is sometimes illustrated and described in the context of image based authentication and one-time dynamic password techniques, one of ordinary skill in the art can apply these concepts to other authentication methods, such as the currently prevalent scheme of text based authentication using alphanumeric passwords. Further, although the invention is described with respect to user password authentication, the kill switch can also be used on a transaction authorization process. For example, when a user places an order with a merchant, the user may enter his name, address, card account number, card expiration date, card verification, payment amount, etc. The kill switch can comprise one or more alphanumeric characters that the user would never enter during this process.

The present invention complements the authentication and security techniques disclosed in currently pending U.S. patent application Ser. No. 12/035,377 ("the '377 application"), entitled "Methods and Systems for graphical Image Authentication," the disclosure of which is incorporated herein in its entirety. The disclosure provided in the '377 application is submitted herewith as Exhibit A. A more detailed explanation of the underlying techniques for generating and implementing graphical-based and one-time dynamic passwords, from which the present invention builds upon, can be found in Exhibit A.

In general, a user is required to select a number of image categories at the time of registration with the authentication and security system that the user can remember at a later time. For example, a user may select three image categories: dogs, cars, and clocks, from a greater number of available image categories. The user need only remember those image categories for generating a dynamic one-time password at a subsequent authentication session. For example, when the user is later presented with a random grid (e.g., 3×3 matrix) of images, each of which is associated with a different alphanumeric character, the user need only identify the images of dogs, cars, and clocks and then enter the corresponding alphanumeric characters. Other non-selected image categories such as, but not limited to fish, flowers, and people, are included in the grid. If the alphanumeric characters entered by the user match those expected by the system (e.g., those displayed and associated with dogs, cars, and clocks), the user is authenticated. If the user enters an unexpected alphanumeric character (e.g., those displayed and associated with fish, flowers, or people), authentication will fail. Such an image-based authentication technique may be used as a stand-alone technique or as a second layer of security on top of a conventional login and password technique.

In the present invention, the user further selects one or more categories of images they will remember to never select ("the kill switch image category"). For example, a user may select cats as a kill switch image category. During a later authentication session, if the purported user enters an alphanumeric character associated with the kill switch image category once or more than a predetermined limit, the entire password entry operation is killed. In other words, by entering an alphanumeric character associated with the kill switch category, the system immediately knows that the purported user is an interloper seeking to breach the authentication system. Brute force attacks will necessarily and eventually select the kill switch image category. Killing the operation can include taking one or more actions, such as immediately locking out the purported user, sending a notification of breach, and/or cataloging information about the source of the breach. Alternatively, the kill switch may comprise an alphanumeric character, e.g., "F", that the user remembers to never enter.

FIG. 1 illustrates a 3×3 image grid identity authentication and security system 100 according to an embodiment of the invention. The system 100 comprises an entry prompt 105, multiple images 110A-I, an alphanumeric character 115A-I associated with each image 110, and one or more kill switch image categories 120. The entry prompt 105 allows the user to enter their dynamic and one-time password, which corresponds to a number of pre-selected image categories. For example, if the user's pre-selected image categories include dogs, the user should enter the character "L" in the entry prompt 105. The user can type the "L" character, or click on the corresponding image 110F and the character "L" is automatically inserted into the entry prompt 105. If the user's other selected image categories are cars and clocks, the user would also enter the characters "H" and "Q." In one embodiment of the invention, the order of entering the characters is not important. For example, the system would accept any permutation of the letters "L", "H", and "Q," i.e., the system would accept "LHQ" as well as "QHL." In another embodiment of the invention, the user must enter the characters in a certain sequence, e.g., dogs, clocks, and then cars—"LQH."

As shown, the images 110A-I comprise nine images and can represent any number of image categories, a portion of which authorize access to the user's account. For example, the image 110F may be a golden retriever or a mixed breed dog, which can fall under the category of dogs. Other categories in the 3×3 system 100 can be cars, clocks, flowers, fish, people, insects, cats, and drinks. These particular categories are exemplary only—one of ordinary skill in the art recognizes that any types and numbers of image categories can be used. Also, the categories can be more specific or general. For example, instead of a dogs category, an image category can stand for pets, animals, golden retrievers, puppies, etc.

The kill switch 120 (e.g., one or more kill switch authentication components, dummy categories, hot buttons, etc.) comprises an insect category in this embodiment. As such, the user should not enter an alphanumeric character corresponding to any type of insect image, e.g., the butterfly image. The kill switch 120 includes one or more image categories that the authorized user would never select while inputting their password. If the kill switch category is entered, e.g., the letter "A" associated with the butterfly, once or too many times, as defined and specified ahead of time by a set of rules and conditions, during password entry, the kill switch kills the entire password entry operation. In a text based password system embodiment, the kill switch includes alphanumeric characters. For example, a user can select one or more keys on the keyboard that the user would never accidentally type when trying to access the account.

To use the system 100, the authorized user receives from the system 100, or selects himself, image categories as his password. For example, the user may choose his password to be the image categories of: dogs, cats, and flowers during registration. To input the password, the user searches the grid for images matching those image categories, and then enters the characters corresponding to the dog, cat, and flower images (e.g., L-U-R in the system 100) into the command prompt 105. The password L-U-R is considered a one-time password, in that future logins using dogs, cats, and flowers might not include those letters. If the user correctly selects images corresponding to the user's password image categories, authentication occurs and the website or mobile application access is allowed.

Although the flower shown on this particular login grid happens to be a rose, the grid for future logins may include other types of flowers (e.g., poppies, irises, daisies, larger roses, different colored roses, etc.). Similarly, future logins may show other types of dogs (e.g., labrador retrievers, bulldogs, puppies, etc.). By using several pictures for a category, the system 100 further prevents computer bots from being able to automate a process to intercept the user's password. Also, although the three password categories of dogs, cats, and flowers are unique, the system 100 may allow the user to select repeating categories as well, such as dog, flower, dog. During an authentication session, the grid of images and alphanumeric characters associated therewith are randomly generated, i.e., a user is presented with a different image grid during each authentication session.

In one embodiment, the order of entry matters, meaning the categories must be memorized and inputted in a particular order. For example, if the user's ordered categories are dogs, then cats, then flowers, the system will not recognize the password typed as flowers, then cats, then dogs (i.e., corresponding to the letters R-U-L). In another embodiment, the order of entry does not matter, meaning the user's selected password categories do not need to be memorized or inputted in a particular order. As such, any entry of any combination of dog, cats, or flowers will be sufficient for access (i.e., any combination of the letters R-U-L). When the order of entry does not matter, it is easier for user's to recall and correctly enter his password, even though it raises the probability of unauthorized access by dictionary or brute force attacks.

Although the kill switch 120 is to be used together with other security methods, the kill switch 120 is a more accurate way to determine that the user is unauthorized, such that the cataloged information becomes more relevant. For example, if a user's kill switch is the equal sign "=", a lockout due to the equal sign being selected is more informative than a lockout due to a password being barely being mistyped a few times (e.g., leaving the CAPS lock on). In fact, the larger the number of chances an unauthorized user has to perform a brute force or dictionary attack to guess the password, the more likely the kill switch 120 will be selected and the unauthorized use can be investigated.

The kill switch 120 can be flexible. The kill switch 120 can be in the grid at all times, or can included just for heightened security occasions such as when a password is replaced by a user or reset by the system. The kill switch 120 can be used with existing techniques and systems, such as techniques to reduce phishing and during CAPTCHA tests ("Completely Automated Public Turing test to tell Computers and Humans Apart") which make sure the user is not a bot. The level of security can be dialed up or down based upon an administrator's preferences. For example, the probability of an unauthorized user hitting a kill switch goes up as more kill switch categories are chosen by the user and presented in a grid.

Figure 2:
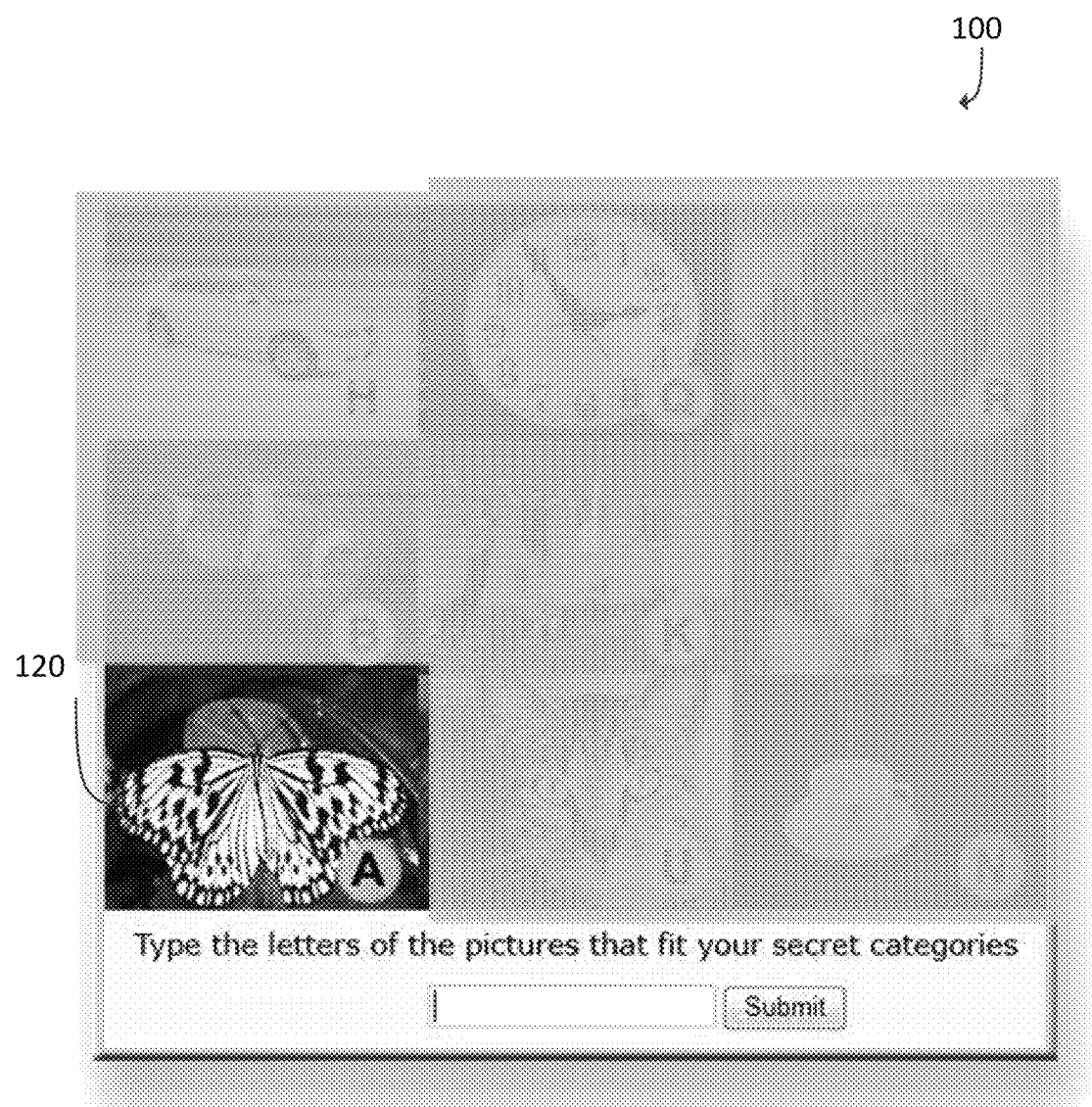
FIG. 2 illustrates a kill switch in the 3×3 system according to an embodiment of the invention.

FIG. 2 illustrates the kill switch 120 in the 3×3 system 100 according to an embodiment of the invention. During this login, the kill switch 120 is a butterfly (or any other image associated with the image category "insects"). Though, in future logins, the grid may comprise another insect as the kill switch 120 (e.g., an ant, a honey bee, a larger butterfly, a butterfly of a different color, etc.). Though, a kill switch does not necessarily need to be included in every login attempt. When the user selects the kill switch 120 one or more times, the user is not granted access. In one embodiment, the user is locked out. In another embodiment, the system 100 discretely or secretly notifies the authorized user (e.g., through email, text, etc.) or a security professional of the attempted breach. The discrete notification is not a warning presented on the password screen which notifies what could be an unauthorized user. If the user is an unauthorized user, the discrete notification would not be known, unless the unauthorized user also has access to the user's other items (e.g., cell phone, email, etc.).

In a further embodiment, the system 100 catalogs or registers the failure and relevant data concerning the source of the attempt. This is a key advantage to the system 100, as selecting the kill switch 120 may be more relevant of an unauthorized use than other methods and thus more worthy of investigating. For example, if a user's password image categories are ponies, kittens, and bunnies, and the kill switch category is football, selecting an image corresponding to the category of football may be more informative indicator of an unauthorized user making too many incorrect entries of dogs, birds, and hamsters. When the football image is selected one or more times, this may be more worthy of an immediate lockout or further investigation.

Figure 3:
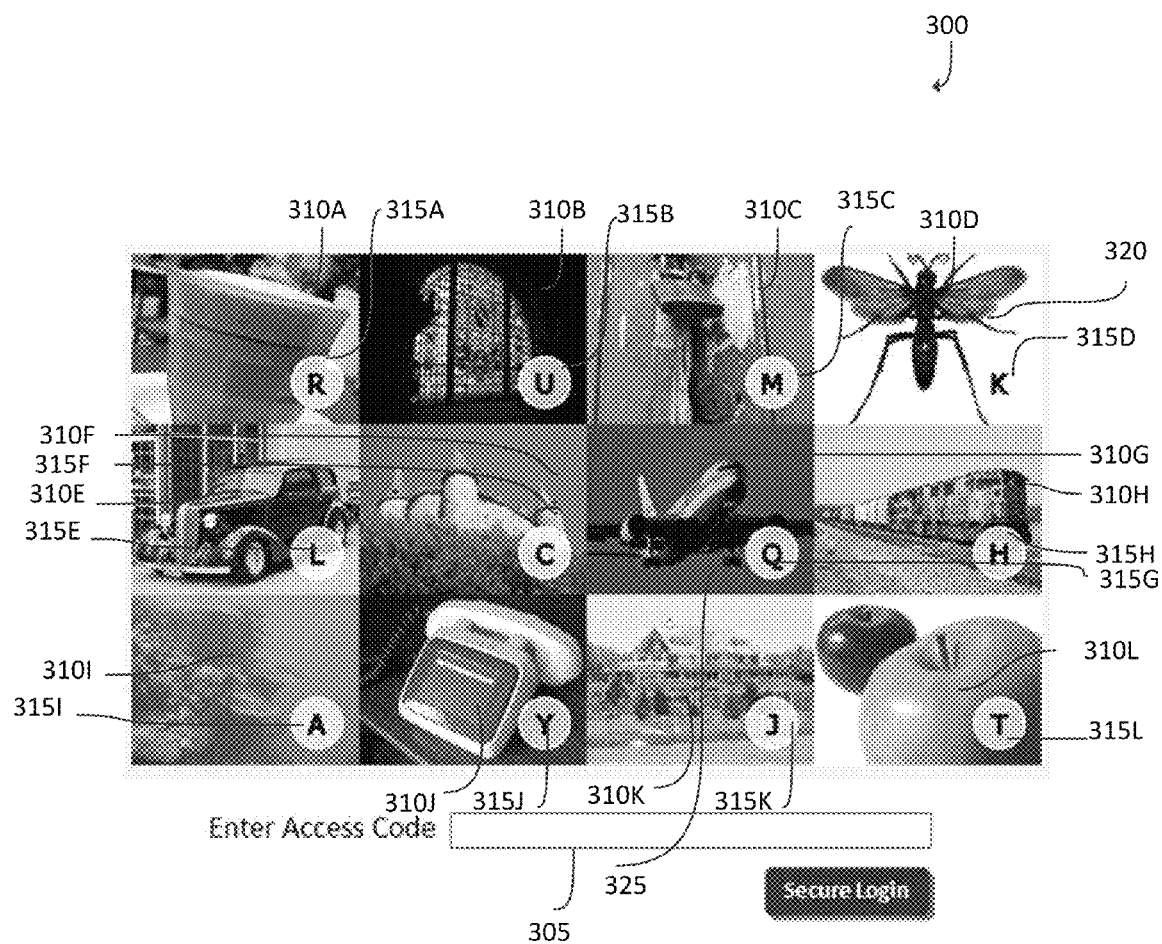
FIG. 3 illustrates a 3×4 image grid identity authentication and security system according to an embodiment of the invention.

FIG. 3 illustrates a 3×4 image grid identity authentication and security system 300 according to an embodiment of the invention. Similar to the system 100, the system 300 comprises an entry prompt 305, images 310A-L, characters 315A-L, and a kill switch 320. The system 300 further comprises a second kill switch 325. The system 300 is a 3×4 grid of images, illustrating that the dimensions of the grid are flexible. The larger the number of images, the more difficult it is for a user to breach the system 300. However, the larger the number of images, the more challenging and less convenient the security process is for the user.

The system 300 also illustrates that the number of kill switches can be flexible as well. Like the kill switch 120, the kill switches 320, 325 are image categories that the authorized user should never select while inputting their password. If one of the kill switches 320, 325 is entered, this kills the password entry operation. The kill switch 325 corresponds to a category of airplanes.

Figure 4:
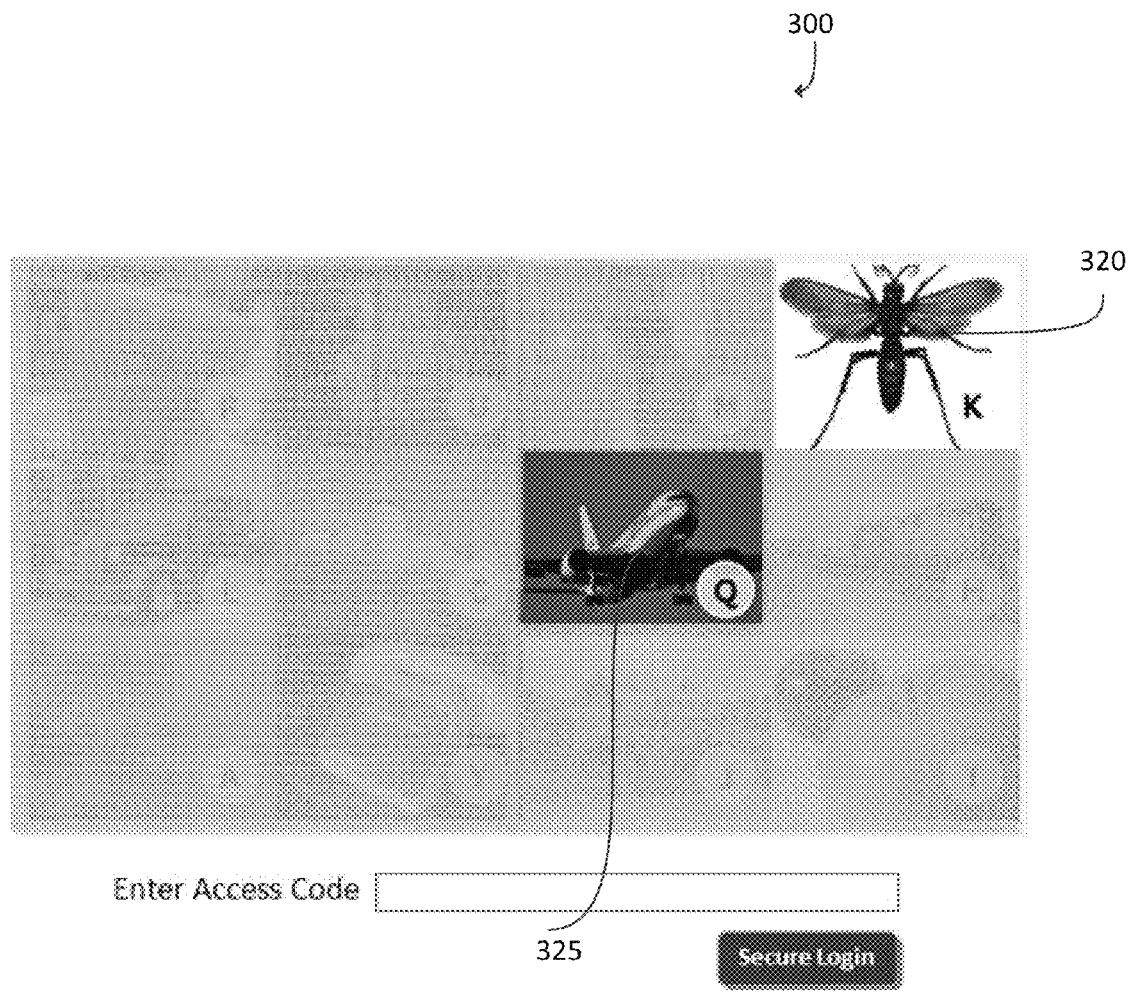
FIG. 4 illustrates a plurality of kill switches in the 3×4 system according to an embodiment of the invention.

FIG. 4 illustrates the plurality of kill switches 320, 325 in the 3×4 system 300 according to an embodiment of the invention. The more kill switches that are selected, the more difficult it is for an unauthorized user to breach the system 300 using a dictionary or brute force attack, and the more likely the unauthorized user will get caught.

Experimental results have shown the inclusion of a kill switch drops the level of unauthorized access dramatically. Although the mathematical results differ depending on the parameters (e.g., grid size, number of chances to access, number of kill switches, etc.), experimental results have found that the probability of access drops from about 25% to less than 1% on a system going from zero to two kill switches, when the order of category selection does not matter. When the order of category selection does matter, the probably of access drops from about 4% to less than 0.1%.

Although the kill switch dramatically improves security, the kill switch is not designed to be used by itself. For example, in image based authentication, a user can also enter a username and password before or after reaching the image authentication stage. Alternatively, the kill switch can be reserved just for heightened security situations, such as during a change of password request. In this role, image authentication with a kill switch could replace conventional authentication systems with easier access (e.g., security questions, sending a user's password to his email, etc.). These conventional systems have easier access because the answers to security questions can often be found through public information (e.g., what city the user went to high school in). Also, most people use their email password for many other accounts with less security (e.g., a free trial offer for a website), and as such, the unauthorized user may have already obtained the user's email password.

Figure 5:
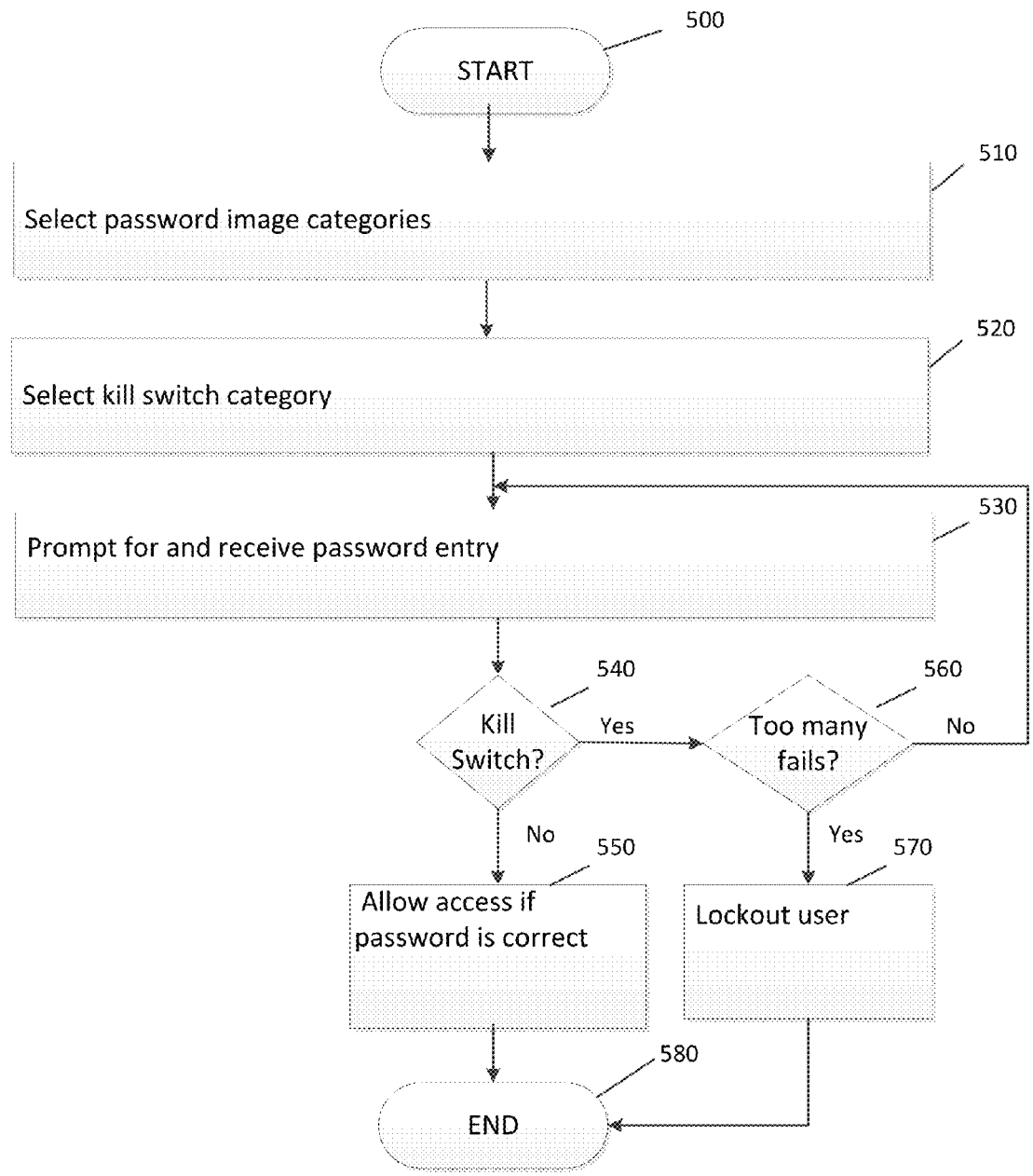
FIG. 5 illustrates a process of providing additional protection using a kill switch according to an embodiment of the invention.

FIG. 5 illustrates a process of providing additional protection using the kill switch 120 according to an embodiment of the invention. The process starts at step 500. At step 510, the user selects the password image categories. The password image categories serve as the user's password. Next, at step 520, the user selects a kill switch category. The kill switch category can be one or more image categories for an image based security system, or one or more alphanumeric texts for text based security, which kills the password login operation. Then, the system 100 prompts the user for and receives the user's password entry at step 530. The password entry should correspond to the image categories selected. At decision step 540, the system 100 determines if the kill switch 120 was input into the entry prompt 105. If not, the system 100 allows access to the user at step 550 if the password was entered correctly. Reverting back to step 540, if the password entry includes the kill switch, then the process proceeds to decision step 560, where the system 100 determines if there have been too many failed attempts. The amount of failed attempts may be set ahead of time by an administrator. If there have been too many failed attempts, the process proceeds to step 570 where the user is locked out or other actions are taken. In another embodiment, other actions taken include cataloging information about the source of the breach. If there have not been too many failed attempts, the process proceeds back to step 530, where the process prompts the user for a password. The process ends at step 580.

In another embodiment of the invention, a security system may define a pre-defined list of unacceptable passwords or password rules that if chosen or violated in an attempt to access an account invokes the aforementioned kill switch techniques. For example, the pre-defined list of unacceptable passwords may include alphanumeric phrases such as, but not limited to "QWERTY" or "12345."

The steps of a method or algorithm described in connection with the embodiments disclosed herein may be embodied directly in a computer or electronic storage, in hardware, in a software module executed by a processor, or in a combination thereof. A software module may reside in a computer storage such as in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a mobile station. In the alternative, the processor and the storage medium may reside as discrete components in a mobile station.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A method for preventing access to a computer system, the method comprising the steps of:
   selecting, by an authorized user of the computer system, a kill switch image category comprising an image category that an authorized user of a computer system would not input during an image based authentication session on the computer system;
   displaying, by the computer system, during the image based authentication session, a plurality of images including an image corresponding to the kill switch image category;
   receiving, by the computer system, during the image based authentication session, an input corresponding to an image from the plurality of displayed images from a non-authorized user;
   determining, by the computer system, that the input is associated with the image corresponding to the kill switch image category; and
   locking out the non-authorized user from the computer system.

2. The method of claim 1, wherein the input comprises an alphanumeric character associated with the image corresponding to kill switch image category.

3. The method of claim 1, further comprising the step of sending a discrete notification of breach to the authorized user or a security professional.

4. The method of claim 1, wherein the image based authentication session is implemented on a computer or smartphone.

5. A method for preventing access to a computer system, the method comprising the steps of:
   pre-selecting, by an authorized user of the computer system, an image category to prevent unauthorized access to the computer system;
   storing, at a computer, the pre-selected image category that an authorized user of a computer system would not input during an image based authentication session;
   displaying, by the computer system, during the image based authentication session, a plurality of images including an image corresponding to the pre-selected image category;
   receiving, at the computer system, a selection of an image from the plurality of images;
   receiving, at the computer system, an indication that a non-authorized user attempting authentication to the computer system has selected an image corresponding to the pre-selected image category during the image based authentication session; and
   locking out the non-authorized user from the computer system.

6. The method of claim 5, wherein the indication is received from a computer or smartphone.

7. The method of claim 1, wherein the kill switch image category is selected to prevent brute force attacks and dictionary attacks.

8. The method of claim 5, wherein the pre-selected image category to prevents brute force attacks and dictionary attacks.

9. A method for preventing access to a computer system, the method comprising the steps of:
   selecting, by a human user of the computer system, a kill switch image category comprising an image category that a human user of the computer system would not enter during a CAPTCHA test;
   displaying, at the computer system during a CAPTCHA test, a plurality of images including an image corresponding to the kill switch image category;
   receiving, by the computer system, during the CAPTCHA test, an input corresponding to an image from the plurality of displayed images;
   receiving, by the computer system, during the CAPTCHA test, an indication that the image corresponding to the kill switch image category has been selected; and
   locking the computer system.

* * * * *